United States Patent [19]
Thatcher et al.

[11] 3,732,749
[45] May 15, 1973

[54] LEVER MECHANISM WITH VARIABLE MECHANICAL ADVANTAGE

[75] Inventors: Raymond Richard James Thatcher, Westdene, Brighton, Sussex; Anthony Gerald Richard Ediss, Burgess Hill, Sussex; Brian James Wheeler, Partridge Green, Sussex, all of England

[73] Assignee: Worcester Valve Company Limited, Haywards, Heath, Sussex, England

[22] Filed: Mar. 8, 1972

[21] Appl. No.: 232,805

[30] Foreign Application Priority Data

Mar. 11, 1971 Great Britain..................6,579/71

[52] U.S. Cl....................................74/518, 251/233
[51] Int. Cl. ................................................G05g 7/04
[58] Field of Search........................74/518, 516, 96, 74/47; 251/233, 231

[56] References Cited

UNITED STATES PATENTS 2,188,783 1/1940 Voight..................................251/231
2,600,499 6/1952 Harrower............................251/233

Primary Examiner—Charles J. Myhre
Assistant Examiner—F. D. Shoemaker
Attorney—Allison C. Collard

[57] ABSTRACT

A lever mechanism for exerting variable torque about the axis of a valve spindle in which a stationary abutment member, a movable abutment member rotatable with the spindle, and a pivot pin are mounted on a valve with a lever arm which provides an initial mechanical advantage between the lever and the spindle until after some rotation has occurred, spindle and lever move in unison with a final mechanical advantage, the initial mechanical advantage being greater than the final mechanical advantage.

4 Claims, 5 Drawing Figures

LEVER MECHANISM WITH VARIABLE MECHANICAL ADVANTAGE

This invention relates to mechanisms for operating fluid-control valves or kindred devices whereby a varying torque may be applied to the actuating member of a valve.

When operating a valve such as, for example, a ball valve between its "open" and "closed" limits, a high initial starting torque may be required to overcome the inherent frictional forces, the torque requirement reducing at the onset of movement. There are devices other than valves which present kindred problems, and the invention is regarded as applicable to them; for example, it is sometimes required to "start" threaded elements such as nuts or studs, which once "started" can be turned with less torque. In some circumstances the invention may be applicable to such kindred devices.

In one aspect according to the invention means are provided for exerting variable torque about the axis of a rotatable member such as a spindle, for example, by means of a lever, comprising the provision of at least one first abutment which is mounted stationarily and radially spaced from the axis and one moving abutment mounted for rotation with said rotatable member and also radially offset, all so that when the rotatable member is in one limiting rotational position the lever, being forced in one sense of direction, abuts the first abutment which then acts as a fulcrum affording an initial mechanical advantage to supply a torque to the rotatable member whilst when some rotation of the lever and rotatable member has occurred the lever abuts the moving abutment so as directly to rotate the rotatable member about its axis with a final mechanical advantage, wherein the initial mechanical advantage is greater than the final mechanical advantage.

Moreover, two sets of stationary abutments may be provided so that the device is operable in either sense of angular direction.

In an elaboration the stationary abutment (the position of which may be adjustable to afford selected mechanical advantage) may take the form of a cam-like contoured surface, upon which the lever will bear preferably in rolling contact, so that the mechanical advantage may vary as the lever is moved, e.g. from a maximum to a lesser value and the lesser value may approximate to the least value i.e. when the lever is acting directly about the spindle axis; such an arrangement can then provide a virtually continuous progressive diminution of advantage. Clearly the arrangement may be used reversely so that mechanical advantage increases with lever movement, e.g. for finally tightening up a screw-down valve or in kindred situations.

According to the invention stated in other terms there is provided a mechanism, for rotating a shaft between first and second positions and for exerting variable torque thereon, which includes an operating lever which may be rotated through an arc between first and second limit stops fixed relative to the shaft wherein the lever, when at a first limit position and with the shaft in the first position, abuts a fixed fulcrum which is provided and pivots thereabout to afford an initial mechanical advantage between the lever and the shaft and, at a position of the lever determined by the position of second limit stop, in moving from the first limit stop to the other the lever ceases to pivot about the fixed fulcrum and thereafter rotates with the shaft towards the second position there being a final mechanical advantage between the shaft and the lever, wherein the initial mechanical advantage is greater than the final mechanical advantage.

A mechanism, according to the invention as applied to a valve spindle, will now be described by way of example with reference to the accompanying drawings which are:

Figure 1:
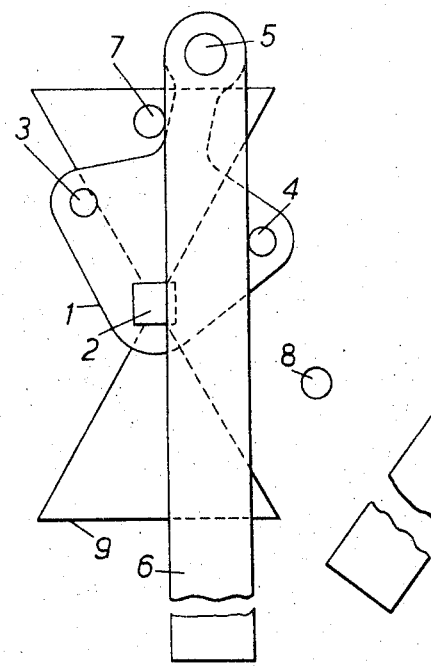
FIG. 1 shows diagrammatically in plan the mechanism in a starting position, i.e. valve either fully open or closed, with the valve depicted symbolically.
Figure 2:
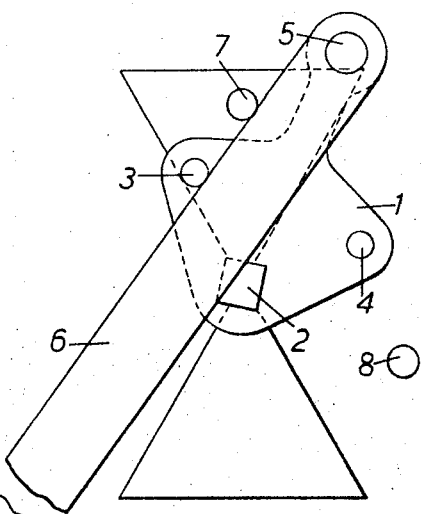
FIG. 2 shows the same diagrammatic view of the mechanism with the operating lever at an intermediate position.
Figure 3:
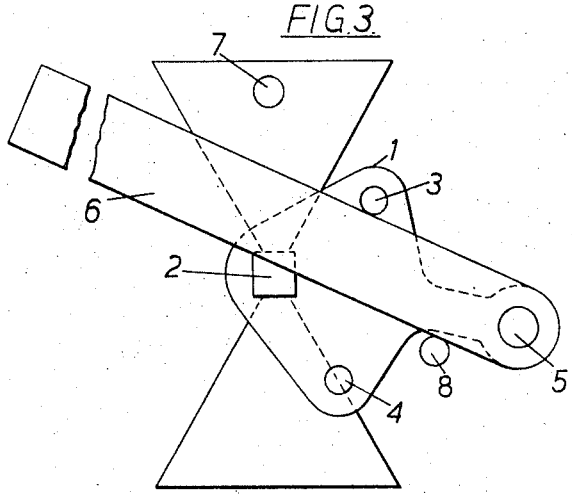
FIG. 3 shows the same diagrammatic view of the mechanism in the final position i.e. valve either closed or fully open.

In order to better understand the invention, FIGS. 1, 2 and 3 are shown in diagrammatic form only.

Referring to FIG. 1, an arm 1 is securely fitted to the stem shaft or ball shank 2 of a valve. The arm 1 carries two stops 3 and 4, also an operating lever 6 pivotally attached thereto, by means of a drive pin 5 and positioned between stops 3 and 4. Two pivot pins 7 and 8 are rigidly mounted adjacent to the valve and fixed relative thereto. All the stops 3 and 4, and pins 7 and 8, are arranged so as to be engageable with the lever 6 during a cycle.

The sequence of a cycle may be in two parts. At the commencement of a cycle the lever 6 is engaged with the pivot pin 7, FIG. 1. A force is then applied to the lever 6 in a direction such as to cause the lever to pivot on pin 7 and move the drive pin 5 in the same rotational direction about the pivot 7 as the applied force on the lever 6. The drive pin 5 thus turns arm 1 and hence the ball shank 2. This action continues until the lever 6 has moved sufficiently to engage with stop 3 which causes the pivoting about, and engagement of the lever 6 with the pivot pin 7, to cease. FIG. 2 shows the lever 6 in this changeover position.

The second part of the cycle occurs when continued force on the lever 6 results in the arm 1 accompanying lever 6 for the remainder of the cycle. Thus, as arm 1 rotates, the stem or ball shank 2 is directly caused to turn. Thus lever 6 now constitutes a direct lever. The cycle ends when the lever 6 engages on the pivot pin 8 which acts as a stop. This prevents any further rotation of the device in the direction of the applied force, and also of the ball shank 2. FIG. 3 shows the valve in this final condition. The valve is now open or closed in the opposite sense to its condition at the start of the cycle.

The device is then ready for the reverse cycle, which is a similar action to the first cycle, but using pivot pin 8 instead of 7, and stop 4 instead of stop 3, to effect the rotation. Pin 7 thus acts as the stop pin. This reverse cycle reverts the valve to its original condition by applying the force to lever 6 in the opposite direction to that for the initial cycle.

The input turning moment can be varied by altering the lengths of lever 6 or arm 1; or by varying the angular rotation of either or both of parts of the cycle. This angular rotation can be varied by altering the position of the stops 3 and 4 and/or the pivot pins 7 and 8, or by varying these factors in combination.

The items are so arranged as to prevent misorientation when assembled, and secured in such a way as to preclude loosening in service.

Figure 4:
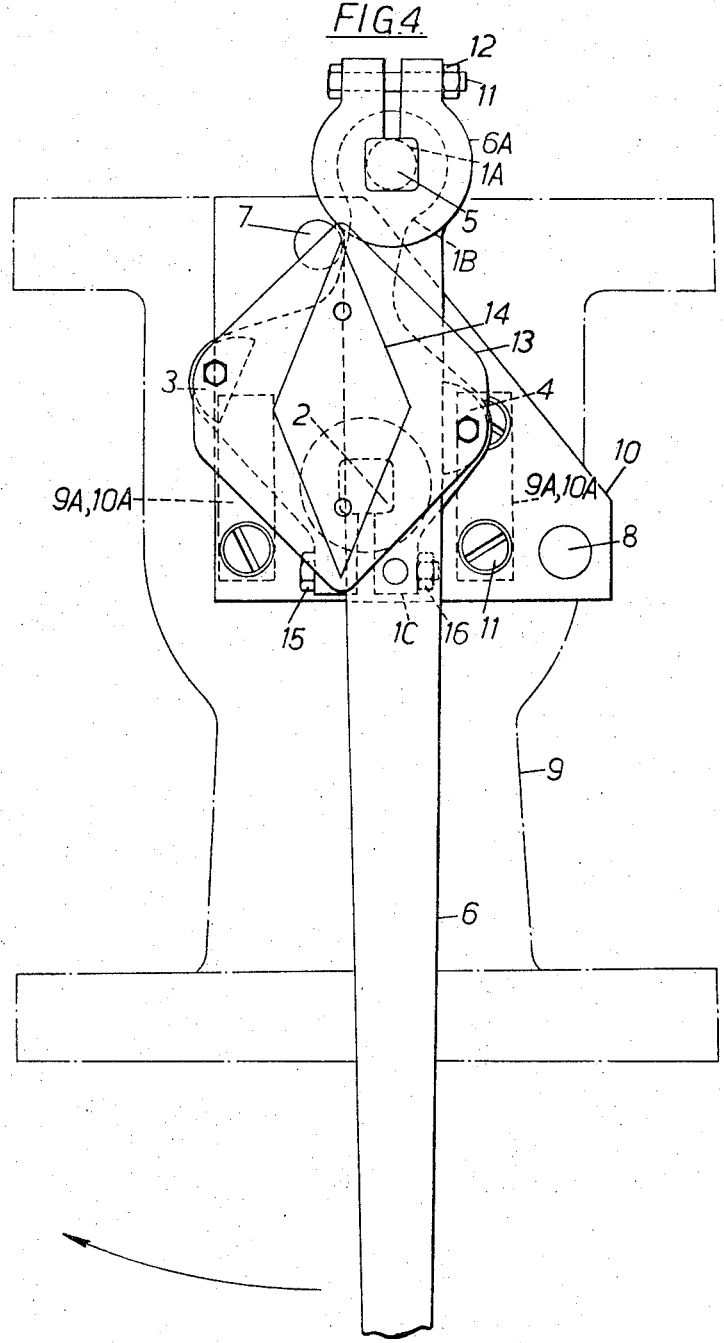
FIG. 4 shows an actual arrangement in plan of the invention applied to a valve spindle.
Figure 5:
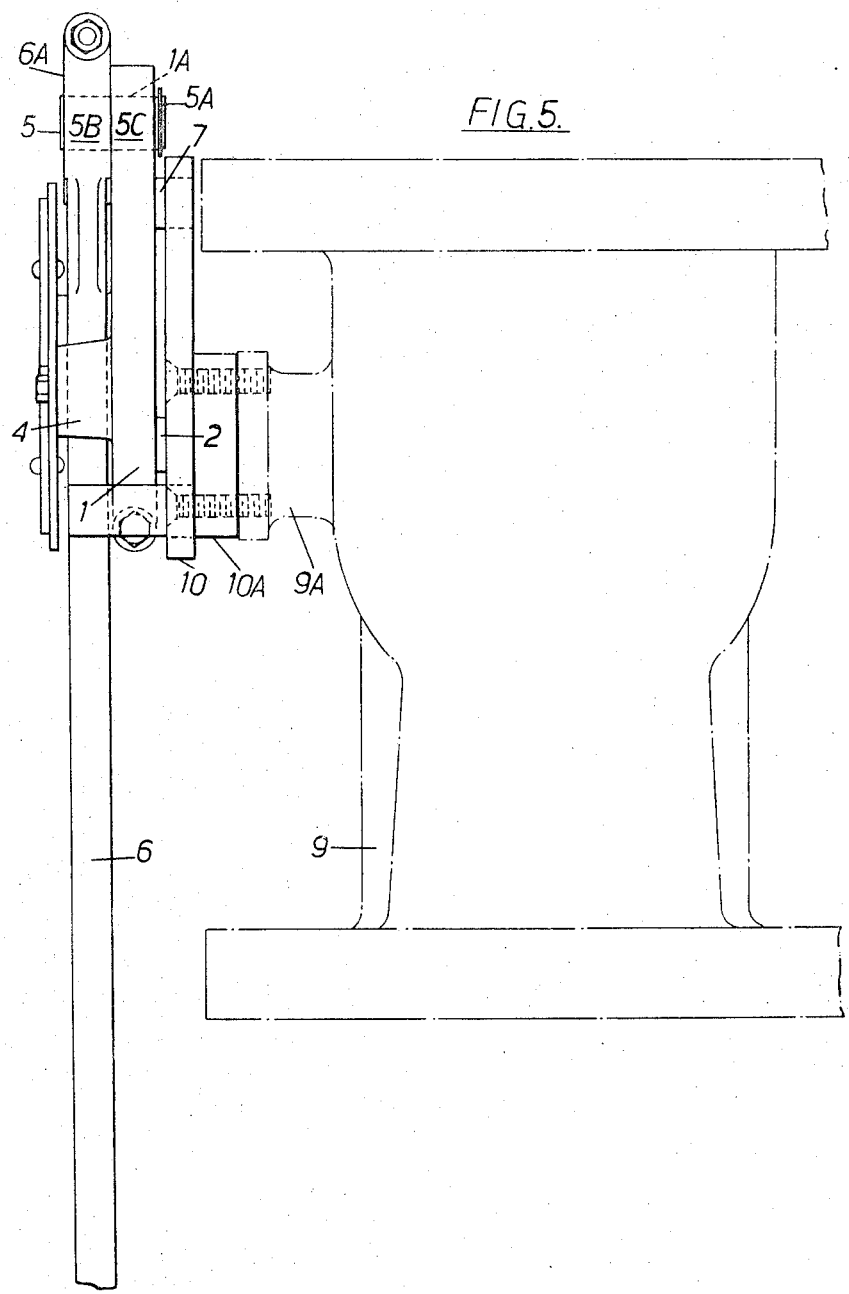
FIG. 5 is an elevation of FIG. 4.

When used for manual operation the lever 6 is generally arranged to be parallel with the flow passage of the valve when the valve is wide open, and also to close the valve upon clockwise rotation of the lever 6, FIGS. 4 and 5 show such an arrangement.

A valve-operating mechanism will now be exemplified with reference to FIGS. 4 and 5 in which the mechanism is shown attached to a ball valve in the "open" position, i.e. with the lever 6 in line with the axis of the valve. To close the valve, a 90° clockwise movement of the valve spindle 2 is required and such movement is provided by the lever 6 operating thereon via the mechanism.

Using the same rotation for the basic components as previously described, two pivot pins 7 and 8 are provided rigidly fastened to a plate 10 which is fixed to extensions or shoulders 9A of valve body 9 by means of screws 11, a hole (not shown) being provided in the plate through which the valve spindle 2 freely extends. The plate 10 is positioned correctly by means of spacers 10A.

Clamped on to the square shank of the valve spindle 2 where it emerges from plate 10 is a rigid platform 1, end 1C of which is split and shaped to accommodate the shank of spindle 2, bolt 15 and associated nut 16 providing the necessary clamping force. Integral with the platform 1 are two stops 3 and 4 positioned as shown, and end 1B, distal from end 1C, is provided with a hole 1A therethrough which receives the round portion 5C of a pin 5, which portion extends rotatably therethrough and is retained therein by a retaining clip 5A. Pin 5 is also provided with a portion 5B of square cross-section onto which is clamped lever 6 which is suitably shaped and split at end 6A thereof, and provided with a bolt 11 and associated nut 12 which provide the necessary clamping force. The lever 6 is so positioned that it may pivot about hole 1A, its arcuate movement being limited by stops 3 and 4.

A further plate 13 is fastened to stops 3 and 4 such that lever 6 is bounded by plate 13 and platform 1 although free to move between its stops 3 and 4. Plate 13 bears upon its outer surface a colored device 14 for indicating the position and state of the valve.

In operation, to close the valve, lever 6 is moved clockwise whereupon it pivots about pin 7 and accordingly urges platform 1 and spindle 2 also to rotate clockwise but at a reduce angular velocity relative to the lever 6. As soon as lever 6 contacts stop 3, it leaves pivot pin 7 so that the platform 1 and spindle 2 now rotate with the same angular velocity as that of lever 6 until the lever 6 abuts pivot pin 8 which, in this sense of direction, acts as a stop defining the "closed" position.

To open the valve, the lever 6 is now moved anticlockwise whereupon it bears upon pivot pin 8 which now acts as a fulcrum, and the valve closes in the same manner as it opened but in the opposite sense of direction.

Although direct reference has been made to valves by way of example, a mechanism according to the invention may be applied to other devices, such as, for example, a machine for producing screw threads, in which a high initial starting torque is to be overcome, and still be within the scope of the invention.

We claim:

1. Means for exerting variable torque about the axis of a valve spindle, comprising a first abutment mounted stationarily and radially spaced from said axis a moving abutment mounted for rotation with said spindle and radially off-set therefrom a pivot mounted for rotation with said spindle and also radially off-set therefrom and a lever mounted on for pivotal movement about said pivot such that when the spindle is in one limiting position, the lever when forced in one sense of direction abuts the first abutment which then acts as a fulcrum so that a torque is applied to the spindle via the pivot with an initial mechanical advantage whilst when some rotation of said lever and said spindle has occurred said lever abuts said moving abutment so as to directly rotate the spindle with a final mechanical advantage wherein the initial mechanical advantage is greater than the final mechanical advantage.

2. Means according to claim 1 in which said pivot and said moving abutment are carred by a member which is fixed to the spindle for rotation therewith.

3. Means according to claim 2 in which said first abutment is carried on a further member which is fixed to the body of the valve.

4. Means according to claim 3 in which said first abutment is shaped so that the position of contact between said lever and said first abutment moves when said lever moves to provide a varying initial mechanical advantage.

* * * * *